(No Model.)
H. J. BUELL.
SADDLETREE.
No. 541,782. Patented June 25, 1895.
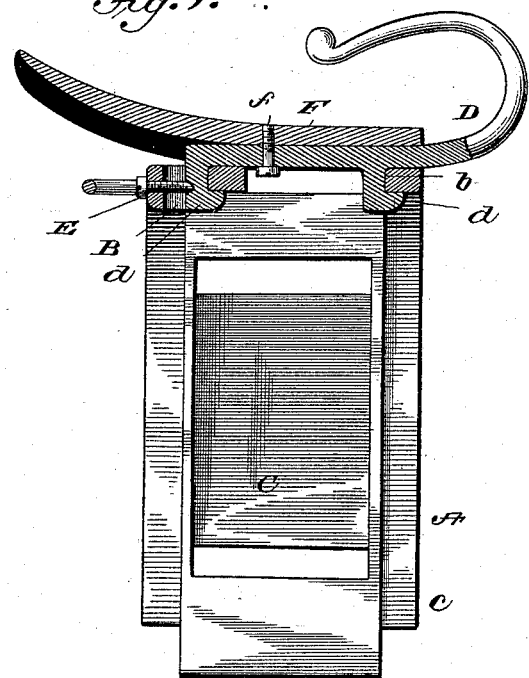
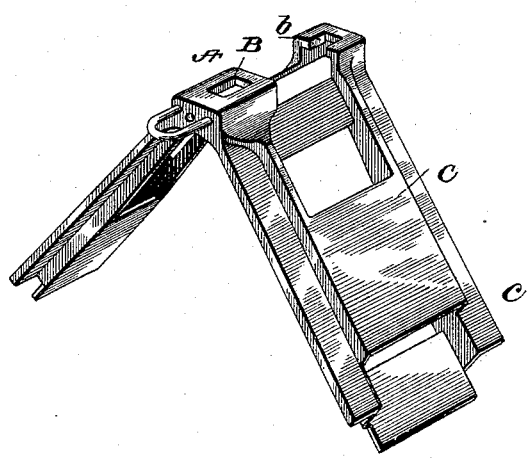
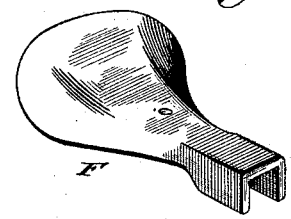
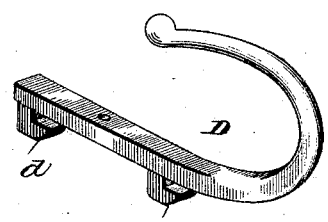
Inventor
Harry J. Buell.
Witnesses
John Imrie
James R. Mansfield.
Alexander & Dowell
Attorneys.

UNITED STATES PATENT OFFICE.

HARRY J. BUELL, OF SOUTH BEND, INDIANA.

SADDLETREE.

SPECIFICATION forming part of Letters Patent No. 541,782, dated June 25, 1895.

Application filed March 12, 1895. Serial No. 541,465. (No model.)

*To all whom it may concern:*

Be it known that I, HARRY J. BUELL, of South Bend, in the county of St. Joseph and State of Indiana, have invented certain new and useful Improvements in Saddletrees; and I do hereby declare that the following is a full, clear, and exact description thereof, reference being had to the accompanying drawings, and to the letters of reference marked thereon, which form part of this specification.

This invention is an improvement in harness-saddles, and has especial reference to the means for detachably securing the hooks thereto.

It consists in the novel construction and combination of parts set forth in the claim, and particularly described as follows:

Referring to the drawings, Figure 1 is a vertical section through the saddle and hook. Fig. 2 is a perspective view of the saddle casting with hook removed. Figs. 3 and 4 are perspective views of the guard-plate and hook detached.

The saddle casting A may be of any suitable construction, but must be provided with slots B, b, in its ridge-portion. As shown it is an irregular V-shaped casting with boxings C for the passage of securing straps, and side flanges c for attachment of leather covering. (Not shown.) The hook D has a pair of key-lugs d, d, on its under side adapted to respectively enter the slots B, b, of the saddle casting, and then by pushing the hook forward the key-lugs lock the hook to the casting, as clearly shown in Fig. 1. A screw E is tapped through the rear edge of the saddle casting opposite slot B, and after the hook is in place this screw is set in, so as to lock the hook in position (as shown in Fig. 1). Thus the hook is securely fastened to the saddle, and the pull of the check rein only tends to hold it more securely in place. The guard-plate F may be fastened on the hook by a screw f, as shown.

It is not necessary that the rear lug d should be a key-lug, if screw E enters a socket therein as indicated in Fig. 1, for the screw itself in such case will hold the rear end of hook down, as well as lock it in place.

As ordinarily constructed the hook is bolted to the guard plate, and then fastened to the saddle by screws inserted upward through the casting; and when the hook breaks the entire saddle has to be taken apart, in order to remove the broken hook and supply another, this repairing being troublesome and expensive.

By my construction the hook can be removed and replaced with ease, and without disturbing other parts of the saddle, or its covering, at all.

Various modifications may be made in the shape and appearance of the hook, and other slight changes, while still embodying the essential features of my invention.

Having thus described my invention, what I therefore claim as new, and desire to secure by Letters Patent thereon, is—

In a saddle-tree, the combination of the saddle-casting, having front and rear slots in its ridge portion, and a detachable hook having a pair of lugs adapted to engage and lock in said slots; with a screw tapped through the saddle-casting in rear of one slot adapted to project into said slot and bind against the lug therein, and thereby keep the hook lugs in engagement with the slots, substantially as and for the purpose set forth.

In testimony that I claim the foregoing as my own I affix my signature in presence of two witnesses.

HARRY J. BUELL.

Witnesses:
JAMES DU SHANE,
WILL G. CRABILL.